(12) United States Patent
Peters et al.

(10) Patent No.: US 10,183,351 B2
(45) Date of Patent: Jan. 22, 2019

(54) PARALLEL STATE-BASED CONTROLLER FOR A WELDING POWER SUPPLY

(75) Inventors: Steven Peters, Huntsburg, OH (US); Judah Henry, Geneva, OH (US); Stephen Cole, Bonita, CA (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1607 days.

(21) Appl. No.: 13/534,119

(22) Filed: Jun. 27, 2012

(65) Prior Publication Data

US 2014/0001166 A1    Jan. 2, 2014

(51) Int. Cl.
*B23K 9/00* (2006.01)
*B23K 11/00* (2006.01)
*B23K 9/02* (2006.01)
*B23K 9/10* (2006.01)
(Continued)

(52) U.S. Cl.
CPC .......... *B23K 9/0216* (2013.01); *B23K 9/1006* (2013.01); *B23K 9/122* (2013.01); *B23K 9/173* (2013.01)

(58) Field of Classification Search
CPC ......... B23K 9/00; B23K 11/00; B23K 210/32
USPC ............... 219/54–60 A, 70, 78.01, 101–116, 219/130.1–133, 137 PS
See application file for complete search history.

(56) References Cited

U.S. PATENT DOCUMENTS

| | | | |
|---|---|---|---|
| 2,857,546 A * | 10/1958 | Lund | B23K 9/0731 219/137.71 |
| 3,727,822 A * | 4/1973 | Umbaugh | B23K 20/10 219/109 |
| 4,019,016 A | 4/1977 | Friedman et al. | |

(Continued)

FOREIGN PATENT DOCUMENTS

CN    1095003 A    11/1994
CN    1706583 A    12/2005
(Continued)

OTHER PUBLICATIONS

Henon, et al., "Automated Narrow Gap Gas Tungsten Arc Welding (GTAW)—Driving Down the Cost of Energy".

(Continued)

*Primary Examiner* — Tu B Hoang
*Assistant Examiner* — Thomas Ward
(74) *Attorney, Agent, or Firm* — Brad C. Spencer

(57) ABSTRACT

An arc welding system includes a welding torch, an electrode, and a power supply having a switching-type power converter connected to the torch. A parallel state-based controller is connected to the power converter and provides a waveform control signal thereto for controlling its operations. The controller generates a motion control signal for controlling movements of the electrode and/or the torch. A sensor senses welding voltage or welding current. A memory stores a welding state table comprising sequential control states, and stores a motion control system state table comprising further sequential control states. The welding wave- (Continued)

form is defined in the welding state table. The controller controls the operations of the power converter through the waveform control signal according to the welding state table, simultaneously adjusting the motion control signal according to the motion control system state table. The controller transitions between control states according to the signal received from the sensor.

9 Claims, 8 Drawing Sheets

(51) Int. Cl.
*B23K 9/12* (2006.01)
*B23K 9/173* (2006.01)

(56) References Cited

U.S. PATENT DOCUMENTS

| | | | |
|---|---|---|---|
| 4,280,137 A | 7/1981 | Ashida et al. | |
| 4,366,362 A | 12/1982 | Ohta | |
| 4,387,289 A | 6/1983 | Nakata | |
| 4,408,114 A * | 10/1983 | Nakata | B23K 11/252 |
| | | | 219/110 |
| 4,491,718 A | 1/1985 | Cook et al. | |
| 4,595,820 A | 6/1986 | Richardson | |
| 4,791,270 A | 12/1988 | Nelson et al. | |
| 4,904,843 A | 2/1990 | Hori | |
| 4,975,558 A | 12/1990 | Lukens | |
| 5,278,390 A | 1/1994 | Blankenship | |
| 6,310,320 B1 | 10/2001 | Bunker | |
| 6,657,163 B1 * | 12/2003 | Blankenship | B23K 9/10 |
| | | | 219/130.01 |
| 6,927,360 B2 | 8/2005 | Artelsmair | |
| 7,307,240 B2 | 12/2007 | Holverson et al. | |
| 7,378,612 B2 | 8/2008 | Takashi et al. | |
| 7,842,904 B2 | 11/2010 | Nakata et al. | |
| 2005/0269306 A1* | 12/2005 | Fulmer | B23K 9/09 |
| | | | 219/130.51 |
| 2007/0056942 A1 | 3/2007 | Daniel et al. | |
| 2008/0053978 A1 | 3/2008 | Peters | |
| 2008/0156782 A1 | 7/2008 | Rice et al. | |
| 2010/0096373 A1 | 4/2010 | Hillen et al. | |
| 2010/0200553 A1 | 8/2010 | Yamazaki et al. | |
| 2010/0230389 A1 | 9/2010 | Hsu et al. | |
| 2011/0132877 A1 | 6/2011 | Miller | |
| 2013/0228555 A1* | 9/2013 | Peters | 219/74 |

FOREIGN PATENT DOCUMENTS

| | | |
|---|---|---|
| DE | 10 2007 017225 A1 | 9/2008 |
| JP | 63192562 A | 8/1988 |
| JP | 10193116 A | 7/1998 |
| WO | 2011/070434 A1 | 6/2011 |
| WO | 2013150364 A1 | 10/2013 |

OTHER PUBLICATIONS

International Search Report for Application No. PCT/IB2013/001365 dated Dec. 17, 2013.
International Preliminary Report on Patentability dated Jan. 8, 2015.

* cited by examiner

PARALLEL STATE-BASED CONTROLLER FOR A WELDING POWER SUPPLY

BACKGROUND OF THE INVENTION

Field of the Invention

The present invention relates to controllers in arc welding systems and to control methodologies for use in arc welding systems.

Description of Related Art

State-based control principles can be employed for controlling a welding waveform that is applied to a workpiece during welding. A state table stored in the welding power supply defines the welding waveform through a number of control states respectively corresponding to different parts of the welding waveform. For example, one state could correspond to a peak current of the welding waveform, while another state could correspond to a background current of the welding waveform. Together, the individual states in the state table define the overall welding waveform.

Separate additional controllers (i.e., separate from the welding power supply) are provided for controlling other aspects of the arc welding system. For example, the arc welding system could have a dedicated controller, such as a motor controller, for positioning and controlling the movements of a welding torch, and another dedicated controller for controlling the wire feed speed of a consumable wire electrode. The arc welding system could have further controllers to control weaving of the welding torch during welding, translation or travel of the torch along the length of the workpiece, circumferential (orbital) movement of the welding torch around a pipe, etc. Such controllers are separate from the state-based welding controller and there is little integration between such controllers and the state-based welding controller. Thus, there is no synergy among the separate controllers. The separate additional controllers tend to operate at much slower control frequencies than the state-based welding controller, to avoid instabilities within the overall welding control system. For example, the separate additional controllers can operate at a control frequency in the range of 1-10 Hz, while the control frequency of the welding controller might be hundreds or thousands of times faster. Further, the separate controllers often require the use of duplicate sensors (e.g., voltage, current, etc.) in the welding system.

BRIEF SUMMARY OF THE INVENTION

In accordance with one aspect of the present invention, provided is an arc welding system. The arc welding system includes a welding torch. An electrode is operatively connected to the welding torch, and receives electrical energy from the welding torch. The electrode establishes an electrical arc from the arc welding system. A welding power supply supplies electrical energy for generating the electrical arc according to a welding waveform. The welding power supply comprises a switching type power converter. The switching type power converter is operatively connected to the welding torch for supplying the electrical energy to the welding torch. A parallel state-based controller is operatively connected to the switching type power converter and provides a waveform control signal to the switching type power converter for controlling operations of the switching type power converter. The parallel state-based controller generates a motion control signal for controlling movements of at least one of the electrode and the welding torch. The parallel state-based controller comprises a processor. A sensor, having an output operatively connected to the parallel state-based controller, senses at least one of a welding voltage and a welding current. A memory portion is operatively connected to the processor and stores a welding state table comprising a first plurality of sequential control states, and a motion control system state table comprising a second plurality of sequential control states. The welding waveform is defined in the welding state table. The parallel state-based controller controls the operations of the switching type power converter through the waveform control signal according to the welding state table, and simultaneously adjusts the motion control signal according to the motion control system state table. The parallel state-based controller transitions between control states of the welding state table according to a signal received from the sensor, and also transitions between control states of the motion control system state table according to the signal received from the sensor.

In accordance with another aspect of the present invention, provided is a method for controlling an arc welding system. The method includes the step of providing the arc welding system. The arc welding system includes a welding torch and a welding power supply. The welding power supply includes a switching type power converter operatively connected to the welding torch. A parallel state-based controller includes a welding state table and a motion control system state table. The arc welding system includes a welding voltage sensor and a welding current sensor. An electrical arc is generated between the arc welding system and a workpiece. The parallel state-based controller controls the switching type power converter to generate a welding waveform according to the welding state table. The welding state table includes a first plurality of sequential control states defining the welding waveform. The step of controlling the switching type power converter comprises sequentially transitioning between control states of the welding state table based on at least one of a welding voltage signal from the welding voltage sensor and a welding current signal from the welding current sensor. The parallel state-based controller, simultaneously with controlling the switching type power converter, controls movement of the welding torch according to the motion control system state table. The motion control system state table includes a second plurality of sequential control states. The step of controlling the movement of the welding torch comprises sequentially transitioning between control states of the motion control system state table based on at least one of the welding voltage signal from the welding voltage sensor and the welding current signal from the welding current sensor.

In accordance with another aspect of the present invention, provided is a method for controlling an arc welding system. The method includes the step of providing the arc welding system. The arc welding system includes a welding electrode and a welding power supply. The welding power supply includes an inverter operatively connected to the welding electrode. A parallel state-based controller includes a welding state table and a motion control system state table. The arc welding system includes a welding voltage sensor and a welding current sensor. An electrical arc is generated between the welding electrode and a workpiece. The parallel state-based controller controls the inverter to generate a welding waveform according to the welding state table. The welding state table includes a first plurality of sequential control states defining the welding waveform. The step of controlling the inverter comprises sequentially transitioning between control states of the welding state table based on at least one of a welding voltage signal from the welding voltage sensor and a welding current signal from the welding current sensor. The parallel state-based controller, simultaneously with controlling the inverter, controls movement of the welding electrode according to the motion control system state table. The motion control system state table includes a second plurality of sequential control states. The step of controlling movement of the welding electrode comprises sequentially transitioning between control states of the motion control system state table based on at least one of the welding voltage signal from the welding voltage sensor and the welding current signal from the welding current sensor.

DETAILED DESCRIPTION OF THE INVENTION

Figure 1:
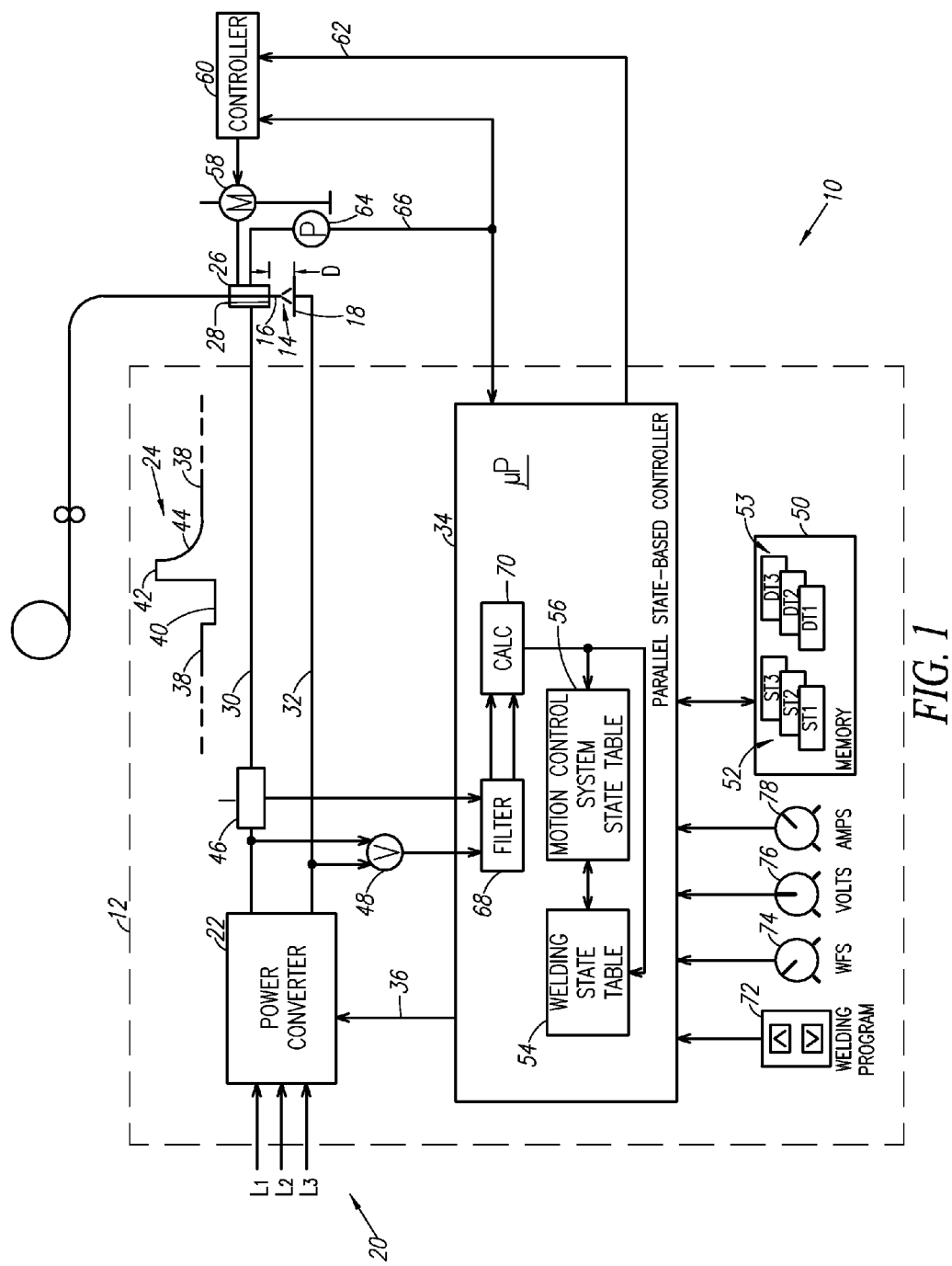
FIG. 1 is a schematic diagram of an example arc welding system.

The present invention relates to controllers in arc welding systems and to control methodologies for use in arc welding systems. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, the term "welding" refers to an arc welding process. Example arc welding processes include gas metal arc welding (GMAW), gas tungsten arc welding (GTAW), flux cored arc welding (FCAW), submerged arc welding (SAW), metal cored arc welding (MCAW), plasma arc welding (PAW), and the like.

As used herein, the terms "electrode" and "welding electrode" refer to electrodes associated with a welding torch that transfer electrical energy from a welding power supply to a workpiece. Example "electrodes" and "welding electrodes" include consumable (e.g., wire) electrodes that are consumed during welding, non-consumable electrodes (e.g., forming a part of a welding torch), and contact tips within a torch for transferring electrical energy to consumable electrodes. Movement of the electrode/welding electrode can refer to movements of the electrode relative to the welding torch and/or the workpiece, such as feeding a consumable wire electrode through the torch toward the workpiece. Movement of the electrode/welding electrode can also refer to movement of the torch itself, relative to the workpiece, along with the torch's contact tip or non-consumable electrode.

An example arc welding system 10 is shown schematically in FIG. 1. The arc welding system 10 includes a welding power supply 12. The welding power supply 12 generates an electric arc 14 between an electrode 16 and a workpiece 18 to perform a welding operation. The welding power supply 12 receives electrical energy for generating the arc 14 from a power source 20, such as a commercial electrical power source or a generator. The power source 20 can be a single phase or a three phase power source.

The welding power supply 12 includes a switching type power converter 22 for generating the arc according to a desired welding waveform 24. Example switching type power converters 22 include inverters, choppers, and the like.

The arc welding system 10 includes a welding torch 26 that is operatively connected to the power converter 22. The power converter 22 supplies electrical energy to the welding torch 26 to perform the welding operation. In FIG. 1, the torch 26 has a contact tip 28 for transferring the electrical energy supplied by the power converter 22 to the electrode 16. It is to be appreciated that the electrode 16 can be either a consumable electrode extending from the welding torch 26 that is consumed during the welding operation, or a non-consumable electrode that is part of the welding torch.

Electrical leads 30, 32 provide a completed circuit for the arc welding current from the power converter 22 through the torch 26 and electrode 16, across the arc 14, and through the workpiece 18.

The welding power supply 10 includes a controller 34, which is a parallel state-based controller. The operation of the parallel state-based controller is discussed in detail below. The parallel state-based controller 34 is operatively connected to the power converter 22 and provides a waveform control signal 36 to the power converter 22. The parallel state-based controller 34 controls the output of the power converter 22 via the waveform control signal 36, and the controller 34 generates the waveform control signal 36 according to a desired welding waveform 24. The welding waveform 24 can have any number of shapes formed by various states or phases of the weld cycle. For example, the welding waveform 24 can have a background current state 38 for maintaining the arc, a short clearing state 40, a peak current state 42, a tail-out current state 44, a ramp-up state with or without overshoot (not shown), etc. The welding waveform 24 can have associated time parameters, such as peak time, ramp-up rate, tail-out speed, etc. The parallel state-based controller 34 adjusts the waveform control signal 36 to achieve a welding operation in accordance with the desired welding waveform 24. The waveform control signal 36 can comprise a plurality of separate control signals for controlling the operation of various switches (e.g., semiconductor switches) within the power converter 22. Further, the waveform control signal 36 can be supplied to a separate controller (e.g., an inverter controller) that is part of the power converter 22.

The parallel state-based controller 34 monitors various aspects of the welding process via feedback signals. For example, a shunt 46 or a current transformer (CT) can provide a welding current feedback signal to the parallel state-based controller 34, and a voltage sensor 48 can provide a welding voltage feedback signal to the controller 34.

The parallel state-based controller 34 can be an electronic controller and may include a processor. The parallel state-based controller 34 can include one or more of a microprocessor, a microcontroller, a digital signal processor (DSP), an application specific integrated circuit (ASIC), a field-programmable gate array (FPGA), discrete logic circuitry, or the like. The parallel state-based controller 34 includes a memory portion 50 (e.g., RAM or ROM). The memory portion 50 can store program instructions defining arc welding programs and motion control programs that cause the parallel state-based controller 34 to provide the functionality ascribed to it herein. In certain embodiments, the parallel state-based controller 34 can access a remote memory (not shown) that stores programs and/or parameters for use by the controller. The parallel state-based controller 34 can access such a remote memory through a network, such as a local area network, a wide area network, the Internet, etc. Example remote memories include remote servers, cloud-based memories, etc.

As noted above, the controller 34 is a parallel state-based controller. The parallel state-based controller 34 controls the welding operation according to state table concepts. The welding operation, including the desired welding waveform 24, is broken down into a series of sequentially-controlled states. Via the waveform control signal 36, the parallel state-based controller 34 controls the output of the power converter 22 in accordance with a present control state. Example control states include OFF, peak current, background current, etc. The parallel state-based controller 34 transitions from control state to control state based on parameters of the welding operation. For example, the parallel state-based controller 34 can transition between control states based on parameters such as the welding current level from the welding current feedback signal, the welding voltage level from the welding voltage feedback signal, elapsed time (e.g., elapsed time in the current state), other feedback signals (e.g., position signals, limit switch states), etc.

The memory portion 50 stores a plurality of state tables 52 for use by the parallel state-based controller 34. The stored state tables 52 include welding state tables and motion control system state tables. The parallel state-based controller 34 implements a welding state table simultaneously with at least one motion control system state table to control the welding operation.

The state tables 52 can include coded parameters representing functions of the various states. For example, a state table having a peak current state would have a parameter representative of the desired peak current. The state tables 52 also include parameters for indicating when a state is to end, and the next state to enter when the present state ends. Each state can be associated with multiple next states, based on various parameters that are monitored during welding. For example, a present state might transition to a first next state if a short circuit condition is detected, and alternatively to a second next state (different from the first next state) based on an elapsed time.

In general, each welding state table comprises a number of separate states that together define the welding waveform and aspects of the welding operation. Each individual state within the welding state table includes at least one parameter or instruction corresponding to the function provided by that state (e.g., peak current level), parameters or checks indicating the end of that state, and parameters indicating the next state or states. In addition to the parameter or instruction corresponding to the function provided by that state, each state can have additional housekeeping tasks to perform. Example housekeeping tasks include resetting timers, clearing counters, and the like. Each state table can have an associated data table 53 that stores various parameters used in the state table. The data table can be configured as a spreadsheet, and the operation of a state table can be modified by changing the entries in its associated data table. It is to be appreciated that a multitude of waveforms can be created by stringing a number of states together, and that welding programs can be modified by adding, removing, and/or reordering states.

The parallel state-based controller 34 performs two or more separate control operations simultaneously (i.e., in parallel) using two or more state tables. In FIG. 1, the parallel state-based controller 34 controls both the welding waveform 24 and the position of the welding torch 26 simultaneously using a welding state table 54 and a motion control system state table 56. The welding state table 54 comprises a first plurality of sequential control states for controlling the welding waveform 24, and the motion control system state table 56 comprises a second plurality of sequential control states for controlling movements of the welding torch 26. For ease of explanation, various control operations are described below as being performed by the parallel state-based controller 34, by the welding state table 54, or by the motion control system state table 56. It is to be appreciated that all such control operations are performed by the parallel state-based controller 34 as it executes the control operations defined in each of the state tables 54, 56.

The welding torch 26 is attached to a motion control system that moves the torch. In FIG. 1, the motion control system is shown schematically as including a motor 58 for moving the welding torch 26 linearly toward and away from the workpiece 18, and a motion control system controller 60 (e.g., a motor controller) that operates the motor 58. It is to be appreciated that the motion control system could move the torch 26 in multiple dimensions, as would be done by a robot, or cause the torch to travel along the length of the workpiece, or cause the torch to oscillate (e.g., weave) during welding. However, in FIG. 1, the motion control system moves the torch in one dimension (e.g., vertically). The motion control system controller 60 receives a motion control signal 62 from the parallel state-based controller 34. The motion control system controller 60 adjusts the position or otherwise controls the movements of the torch 26 in accordance with the motion control signal 62 received from the parallel state-based controller 34. The motion control signal 62 can be an analog signal (e.g., 0-10 VDC, 4-20 mA, etc.) or a digital signal. In certain embodiments, the motion control system controller 60 and the parallel state-based controller 34 communicate bidirectionally, such as via bidirectional serial communications (e.g., USB, Ethernet, etc).

A position sensor 64 senses the position or movements of the torch 26, and provides a position feedback signal 66 to the parallel state-based controller 34 and/or to the motion control system controller 60. The position feedback signal 66 can be used by the parallel state-based controller 34 and the motion control system controller 60 in their respective control operations. Moreover, both the welding state table 54 and the motion control system state table 56 can include the torch position as a parameter associated with one or more states in each state table. The position sensor 64 can sense absolute position, amount of movement, speed, and or direction of motion.

The position sensor 64 is schematically shown as sensing the position of the torch 26. However, the position sensor 64 could sense other conditions, such as rotation of the motor 58, position of the workpiece 18, length of the arc, and the like.

The motion control system state table 56 contains a plurality of states associated with movements of the welding torch 26. The states in the motion control system state table 56 operate in conjunction with the states in the welding state table 54 to effect a desired welding operation. Because the welding control instructions and motion control instructions contained respectively in the welding state table 54 and the motion control system state table 56 are performed by a common controller 34, the state-based motion control can be tightly coupled to the state-based welding control. This allows the state-based motion control to be performed at a fast rate when compared to conventional control systems that employ separate welding and motion controllers. The use of separate welding and motion controllers often requires duplicate sensors and adds delay (e.g., 50 ms or more) between the operations of the controllers, and such delay can be undesirable when close control between the controllers is needed. Also, the feedback signals (e.g., welding voltage, current, etc.) used by conventional motion controllers are sometimes noisy, which can impact the ability of the motion controller operate quickly and/or correctly. Close control between the welding states and the movement of the welding torch or the welding electrode can be desirable during operations such as: (a) touch retract starting; (b) stopping or retracting upon sensing a short circuit; (c) adaptive or modulated electrode wire feed speed processes; (d) automatic stick out control (e.g., regulating contact tip to work distance); (e) weaving systems with or without automatic voltage control; (f) seam tracking; (g) orbital pipe welding using bug systems with control based on the position of the bug, etc. The common controller approach shown in FIG. 1 allows information to be shared between the state tables in real time, and each state table can quickly make adjustments based on, or take into account, the control actions of the other state table. The common controller approach also allows the state transitions in each state table 54, 56 to occur based on the same parameter (e.g., a shared parameter or feedback signal). Accordingly, the state-based motion control can be performed quickly, without causing control instabilities, such as position "hunting" by the motion control system. For example, while controlling the power converter 22, the parallel state-based controller 34 can update the motion control signal 62 (e.g., update the signal level) at a frequency of 100 Hz or more, which is a much faster control rate than in conventional systems that typically operate in the range of 1 Hz.

Figure 2:
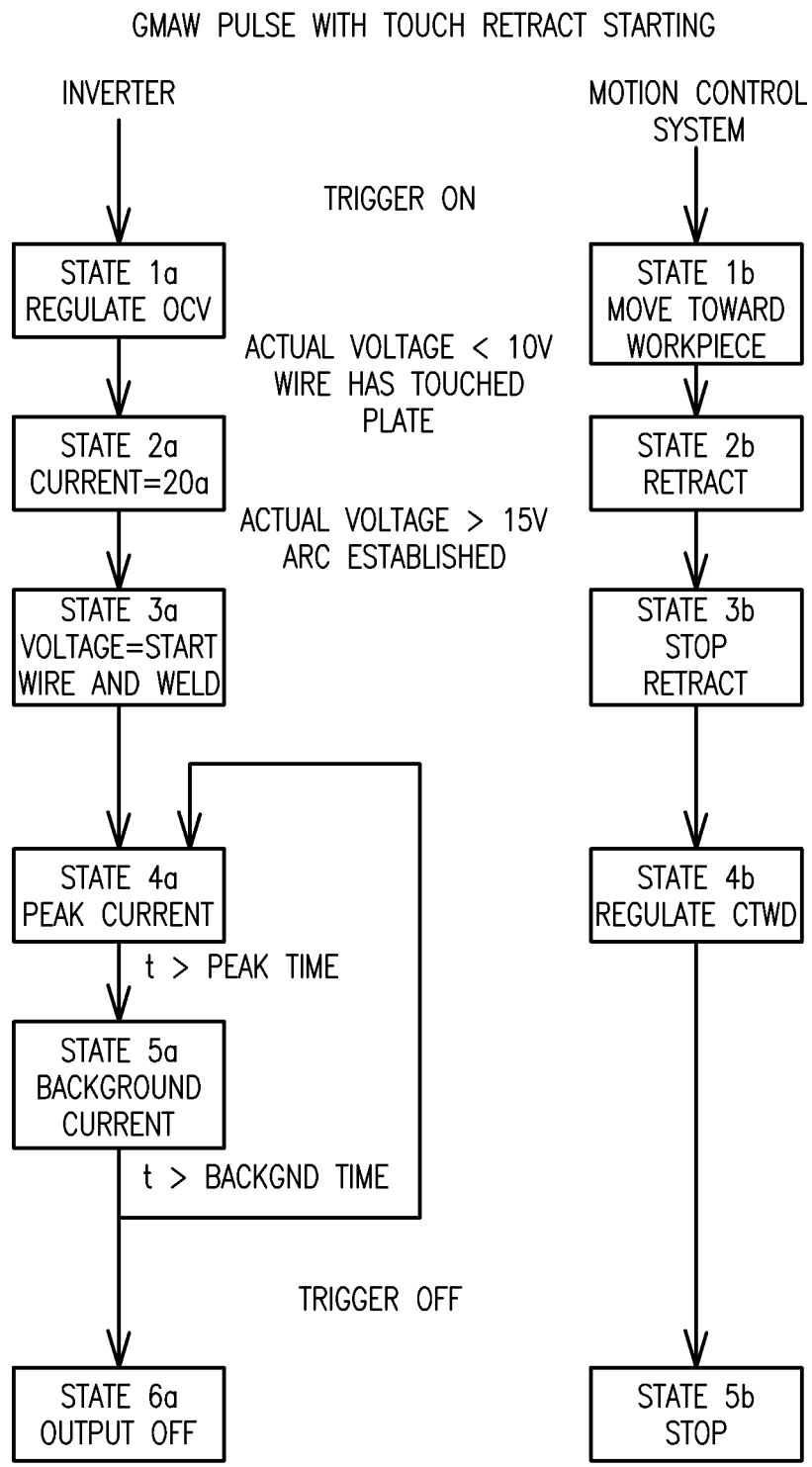
FIG. 2 is a state diagram.

FIG. 2 provides example state diagrams showing how a welding inverter and a motion control system can be controlled simultaneously using parallel state tables as discussed above. Because the control states are implemented by a common controller 34 (FIG. 1), parameters or calculations occurring during the execution of one state table can be quickly shared and used by the other state table. Thus, the state tables can be conceptually thought of as sharing or exchanging information. Moreover, the same feedback signals, such as welding voltage, welding current, torch position, etc., can be used in both state tables to control state transitions within the state tables.

In FIG. 2, aspects of the welding state table are shown on the left and aspects of the motion control system state table are shown on the right. The welding state table and the motion control system state table operate together to perform a touch retract starting of the welding operation, and to regulate the contact tip to work distance (CTWD) of the welding torch. CTWD is shown in FIG. 1 as distance "D", and CTWD can be adjusted by moving the welding torch up and down. Regulating CTWD will serve to regulate the arc length of the welding arc.

When a trigger associated with the welding torch is switched on, the parallel state-based controller initially controls the inverter according to state 1a and the torch movement according to state 1b. In state 1a, the parallel state-based controller regulates the open circuit voltage (OCV) of the welding power supply while moving the torch toward the workpiece. Both the welding state table and the motion control system state table respond to a decreased welding voltage (e.g., <10 V) from the voltage sensor, which indicates that the welding wire has touched the workpiece. Accordingly, the welding state table and the motion control system state table transition to states 2a and 2b, respectively. In state 2a, the parallel state-based controller adjusts the waveform control signal supplied to the inverter to achieve a welding current of 20 A, and also adjusts the motion control signal to make the torch retract. When the welding voltage increases (e.g., >15V), an arc has been established, and the state tables transition to states 3a and 3b. In state 3a, the parallel state-based controller instructs a feeder to begin feeding the welding wire at a desired wire feed speed (WFS), and adjusts the motion control signal so that the torch stops retracting. The welding state table now controls the welding operation by alternating between a peak current state (4a) and a background current state (5a) based on predetermined times (e.g., peak time and background time), while the motion control system state table regulates CTWD (state 4b). When the elapsed time in the peak current state exceeds the peak time (t>peak time), the welding state table transitions to the background state and the timer is reset; when the elapsed time in the background state exceeds the background time (t>background time), the welding state table transitions back to the peak current state and the timer is again reset. The welding state table continues to alternate between the peak current state (4a) and the background current state (5a) while the motion control system state table regulates CTWD (state 4b) until the trigger is switched off. Then, both state tables enter an OFF 6a or STOP 5b state.

It is to be appreciated that CTWD is affected by the shape of the workpiece and/or imperfections in the workpiece (e.g., high and low spots). Thus, the CTWD can change during welding. CTWD can be determined by the parallel state-based controller 34 directly from an appropriate feedback signal or signals (e.g., via position measurements). CTWD is also related to welding parameters (e.g., is proportional to welding voltage) and, thus, can also be determined from welding parameters, such as welding voltage, welding current, etc. For example, during a constant current or regulated current welding procedure, an increased CTWD will be observable as an increased average welding voltage, while a decreased CTWD will be observable as a decreased average welding voltage. In a constant voltage or regulated voltage welding procedure, an increased CTWD will be observable as a decreased average welding current, while a decreased CTWD will be observable as an increased average welding current. The motion control system state table can regulate CTWD by comparing feedback signals (e.g., welding voltage, welding current, etc.) to a reference, and adjusting CTWD based on an error signal, which is the difference between the feedback signal and the reference signal. In regulating CTWD, the motion control system state table can consider specific properties of the feedback signal, such as its average value (e.g., average voltage), its peak value (e.g., peak current), an integrated value, etc.

Adaptive control schemes are known in which the welding power supply adjusts for changes in CTWD by controlling welding current to maintain a constant arc length. The power converter operates at a frequency in the range of 40 to 120 kHz, and, thus can adjust the welding waveform very quickly. The adaptive control adjusts welding current based on average voltage. In general, the welding waveform has a frequency between 20 and 300 Hz, and the adaptive control operates in such a range. Because the adaptive control operates more slowly than the power converter, the two work well together. When motion control of the torch and/or electrode is added as discussed above, it can be desirable to eliminate the adaptive control and allow the motion control system state table 56 to alone adjust for changes in CTWD. In this case, the motion control signal 62 can be updated at a frequency of 100 Hz or more, similar to the speed of the adaptive control. Alternatively, the adaptive control can be maintained and the speed of the motion control reduced to approximately 10 Hz, for example.

Turning to FIG. 1, the welding state table 54 and the motion control system state table 56 can use the feedback signals (welding voltage, welding current, position, etc.) directly, or the feedback signals can be processed and then used by the state tables. For example, the parallel state-based controller 34 can include one or more filters 68 or calculation blocks 70 for processing the feedback signals. Via filters and other processing blocks, the state tables 54, 56 can make use of such parameters as average current and voltage, average position, peak current and voltage, average and peak power, integrated and derivative values, etc. Welding power can be calculated by a calculation block that multiplies the voltage and current feedback signals, and welding power can be processed by additional calculation blocks (not shown).

The memory portion 50 can store a plurality of welding state tables and a plurality of motion control system state tables, and their associated data tables. The parallel state-based controller 34 can select a particular welding state table and/or a motion control system state table for use in controlling the welding operation based on user inputs at the welding power supply 12. For example, the welding power supply 12 can include an input device 72 that allows a user to select a particular welding program, and input devices 74, 76, 78 for setting various parameters such as WFS, Volts, Amps, weld size (e.g., ¼ inch, ⁵⁄₁₆ inch, etc.) The parallel state-based controller 34 can select and/or modify an appropriate welding state table and/or a motion control system state table based on the user inputs. In certain embodiments, the welding power supply 12 is configured to select a welding program including a welding state table and a motion control system state table from a single user input, such as the weld size, WFS, etc. The welding power supply 12 can further include an output device, such as a display, for informing the user of the selected welding program, various welding parameters, etc.

In addition to feedback signals such as welding voltage, welding current, and the position of the welding torch, it is to be appreciated that the state tables 54, 56 can make use of numerous additional parameters in performing their control functions, such as analog and digital inputs from the welding system, the status of internal timers and flags, input device 74, 76, 78 settings, etc.

In certain embodiments, the parallel state-based controller 34 automatically selects a particular motion control system state table based on characteristics of the welding state table 54 that is selected for use in a welding operation. For example, the welding state table 54 can be configured for welding at a constant or regulated current or a constant or regulated power level, and the parallel state-based controller 34 can automatically select an appropriate state table that regulates CTWD based on voltage (e.g., average voltage, peak voltage, voltage changes, etc.) as the motion control system state table 56. Similarly, the welding state table 54 can be configured for welding at a constant or regulated voltage level, and the parallel state-based controller 34 can automatically select an appropriate state table that regulates CTWD based on current (e.g., average current, peak voltage, changes in current, etc.) as the motion control system state table 56. When the welding state table 54 is changed (e.g., when a different welding state table is selected for controlling the welding operation) from one that regulates welding voltage to one that regulates welding current, the parallel state-based controller 34 can automatically change the motion control system state table 56 accordingly, from one that regulates CTWD based on welding current to one that regulates CTWD based on voltage. Rather than regulating CTWD, the automatically-selected motion control state table can control aspects of the welding operation such as WFS, travel of the welding torch along the workpiece, travel of the welding torch around a pipe, and the like.

Example associations of the types of welding procedures implemented by different welding state tables and the feedback signals used by respective motion control system state tables to control CTWD are as follows:

| Welding Process of Welding State Table |
|---|
| Constant Current GTAW |
| Constant Voltage GMAW |
| Constant Current GMAW |
| Constant Current Pulsed GTAW |
| Constant Current Pulsed GMAW |
| Adaptive Pulsed GMAW |

| Feedback Signal for Regulating CTWD By Motion Control System State Table |
|---|
| Average Voltage |
| Average Current |
| Average Voltage |
| Peak Voltage |
| Peak Voltage |
| Average Power |

Figure 3:
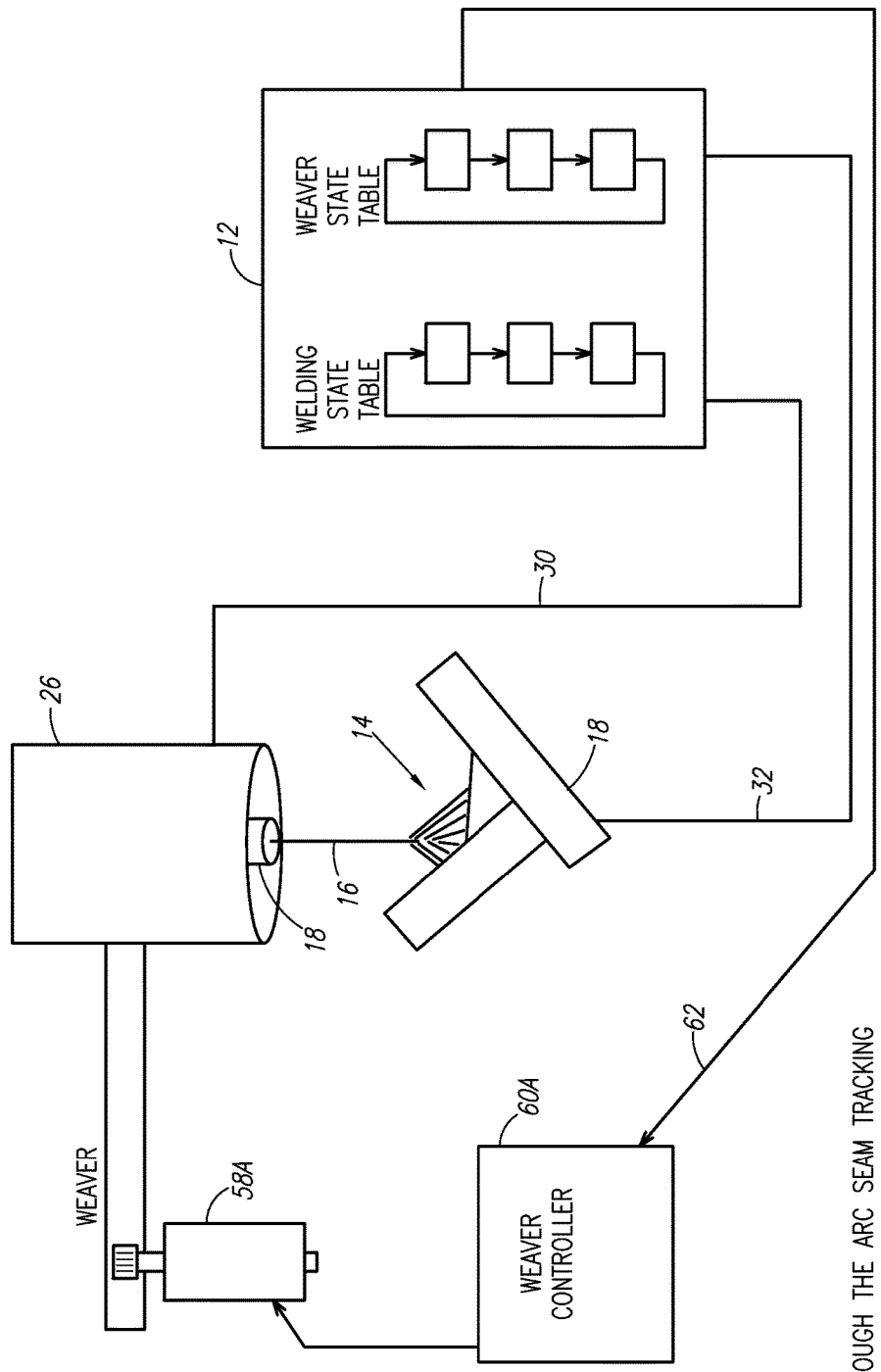
FIG. 3 is a schematic diagram of an example arc welding system.

Turning to FIG. 3, in an example embodiment, the motion control system includes a weaver controller 60a and a weaver motor 58a that can be a part of a through the arc seam tracking system. The weaver motor causes the welding torch 26 to oscillate to perform weave welding movements in accordance with the motion control signal 62. The welding power supply 12 controls both the welding operation and the movements of the welding torch 26 using a parallel state-based controller as discussed above. In this case, the motion control system state table (shown as a "weaver state table" in FIG. 3) is configured to control oscillating weave welding movements of the welding torch 26. The welding power supply 12 can control the welding current and the oscillating weave welding movements of the welding torch 26 to obtain a predetermined weld size (e.g., a fractional inch) using plural state tables. In controlling the weaving of the welding torch 26 during welding, the welding power supply 12 can regulate CTWD as discussed above, and/or control the oscillation speed of the torch. The welding power supply 12 can also determine the edges of the welding joint based on the welding voltage and/or welding current feedback signals. Via the motion control signal 62 (e.g., according to the signal level of the motion control signal), the welding power supply 12 can control the oscillation speed of the torch and/or the position of the torch relative to the workpiece 18.

Figure 4:
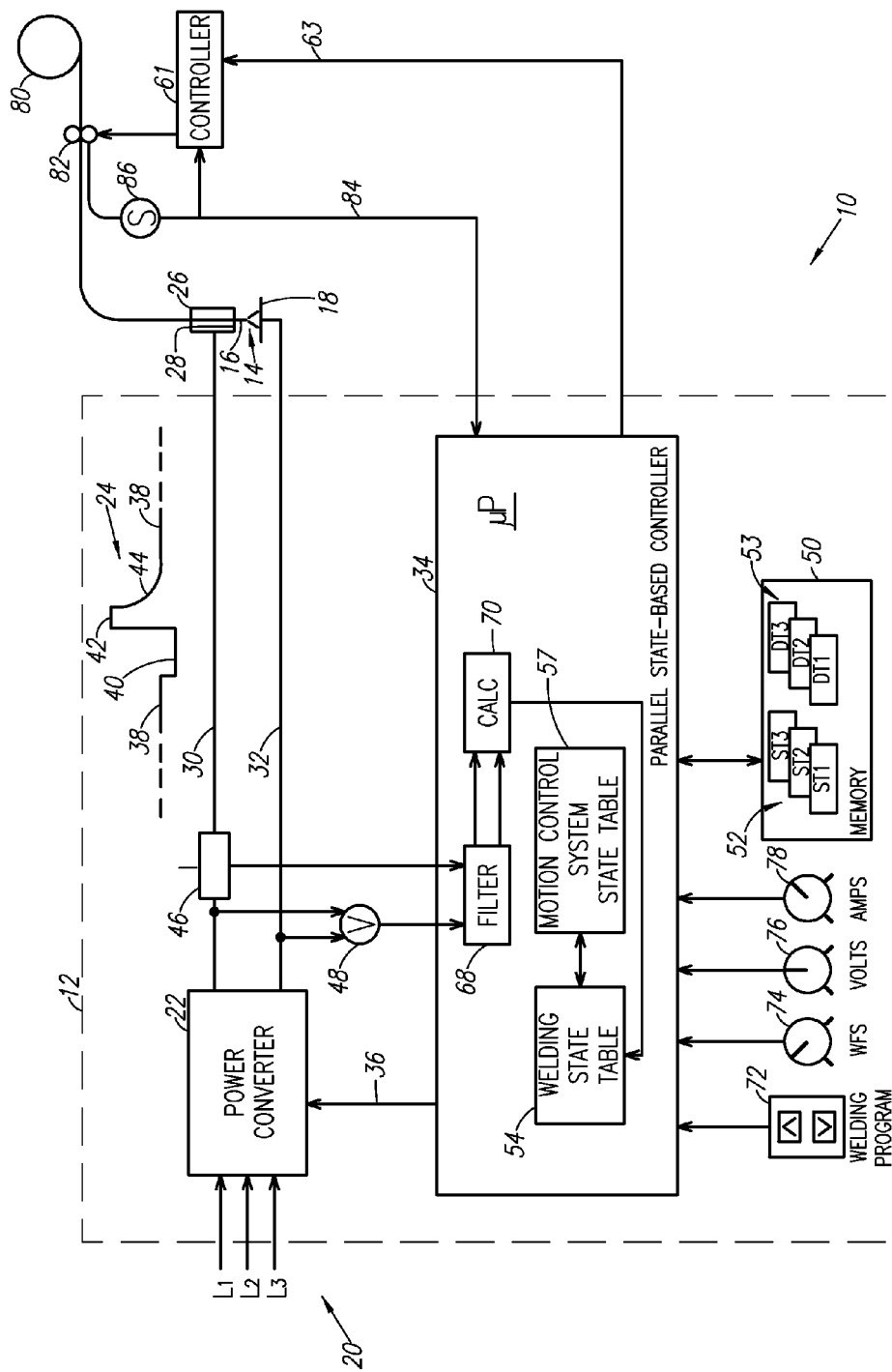
FIG. 4 is a schematic diagram of an example arc welding system.

Turning to FIG. 4, FIG. 4 shows an example embodiment in which the parallel state-based controller 34 controls the wire feed speed (WFS) of the electrode 16. The electrode 16 is fed from a spool 80 by motor-operated pinch rollers 82. The motor-operated pinch rollers 82 are part of a motion control system for the electrode 16. The motion control system further includes a motion control system controller 61 (e.g., a motor controller) that operates the pinch rollers 82. The motion control system controller 61 receives a motion control signal 63 from the parallel state-based controller 34, and the motion control system controller 61 adjusts the WFS in accordance with the motion control signal 63 received from the parallel state-based controller. In FIG. 4, the motion control signal 63 is a WFS control signal that is determined by the motion control system state table 57. The motion control signal 63 can be an analog signal or a digital signal.

The motion control system state table 57 is similar to the motion control system state table 56 discussed above, except that it is configured to control WFS or deposition rate, rather than CTWD, in coordination with the welding operation defined in the welding state table 54. Thus, the motion control system state table 57 can have different states from those discussed above with respect to FIGS. 1-2. For example, the motion control system state table 57 can have states such as regulate motor speed, ramp speed, brake, brake and reverse, etc.

The parallel state-based controller 34 and the motion control system controller 61 receive a speed feedback signal 84 from a speed sensor 86 that indicates the speed of the motor-operated pinch rollers 82 or the speed of the electrode 16. An example speed sensor 86 is an encoder or other rotational sensor that senses the actual speed of the pinch rollers, the speed of a motor driving the pinch rollers, or the speed of a gear for driving the pinch rollers. The sensor 86 could also directly measure the speed and or direction of the electrode 16.

Figure 5:
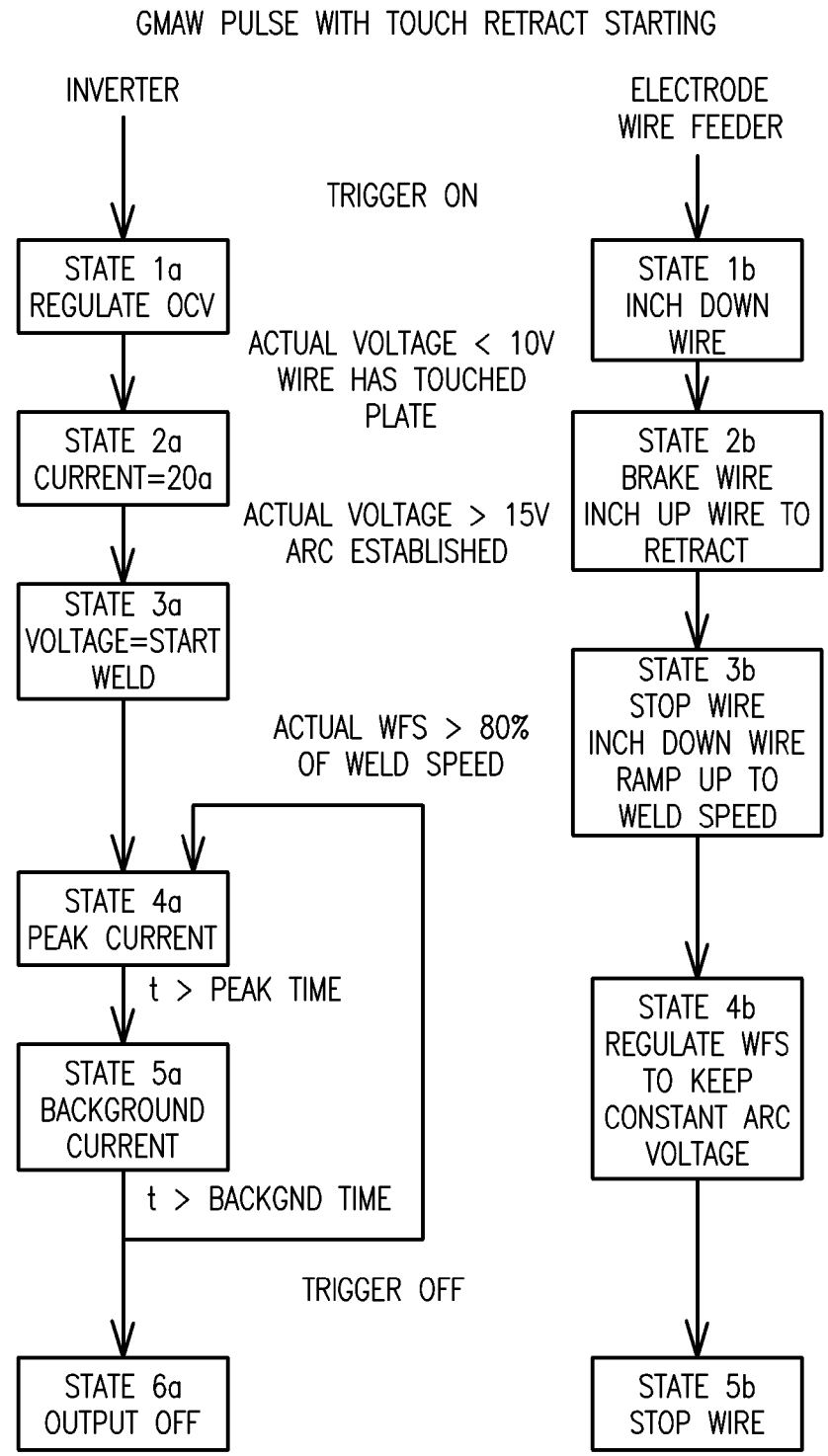
FIG. 5 is a state diagram.

FIG. 5 provides example state diagrams showing how a welding inverter and an electrode wire feeder can be controlled simultaneously using parallel state tables as discussed above. Aspects of the welding state table are shown on the left and aspects of the motion control system state table are shown on the right. The welding state table and the motion control system state table operate together to perform a touch retract starting of the welding operation, and to regulate WFS. When a trigger associated with the welding torch is switched on, the parallel state-based controller initially controls the inverter according to state 1a and the electrode movement according to state 1b. In state 1a, the parallel state-based controller regulates the open circuit voltage (OCV) of the welding power supply while moving the wire electrode toward the workpiece. Both the welding state table and the motion control system state table respond to a decreased welding voltage (e.g., <10 V) from the voltage sensor, which indicates that the wire electrode has touched the workpiece. Accordingly, the welding state table and the motion control system state table transition to states 2a and 2b, respectively. In state 2a, the parallel state-based controller adjusts the waveform control signal supplied to the inverter to achieve a welding current of 20 A, and also adjusts the motion control signal to make the wire electrode brake and retract from the workpiece. When the welding voltage increases (e.g., >15V), an arc has been established, and the state tables transition to states 3a and 3b. In state 3a, the parallel state-based controller begins actual welding, and adjusts the motion control signal so that the wire electrode stops retracting, moves again toward the workpiece, and ramps up to welding WFS. When actual WFS from the speed feedback signal exceeds 80% of the weld WFS, the welding state table controls the welding operation by alternating between a peak current state (4a) and a background current state (5a) based on predetermined times, while the motion control system state table regulates WFS to maintain a predetermined welding or arc voltage (state 4b). The welding state table continues to alternate between a peak current state (4a) and a background current while the motion control system state table regulates WFS (state 4b) until the trigger is switched off. Then, both state tables enter an OFF 6a or STOP 5b state.

Figure 6:
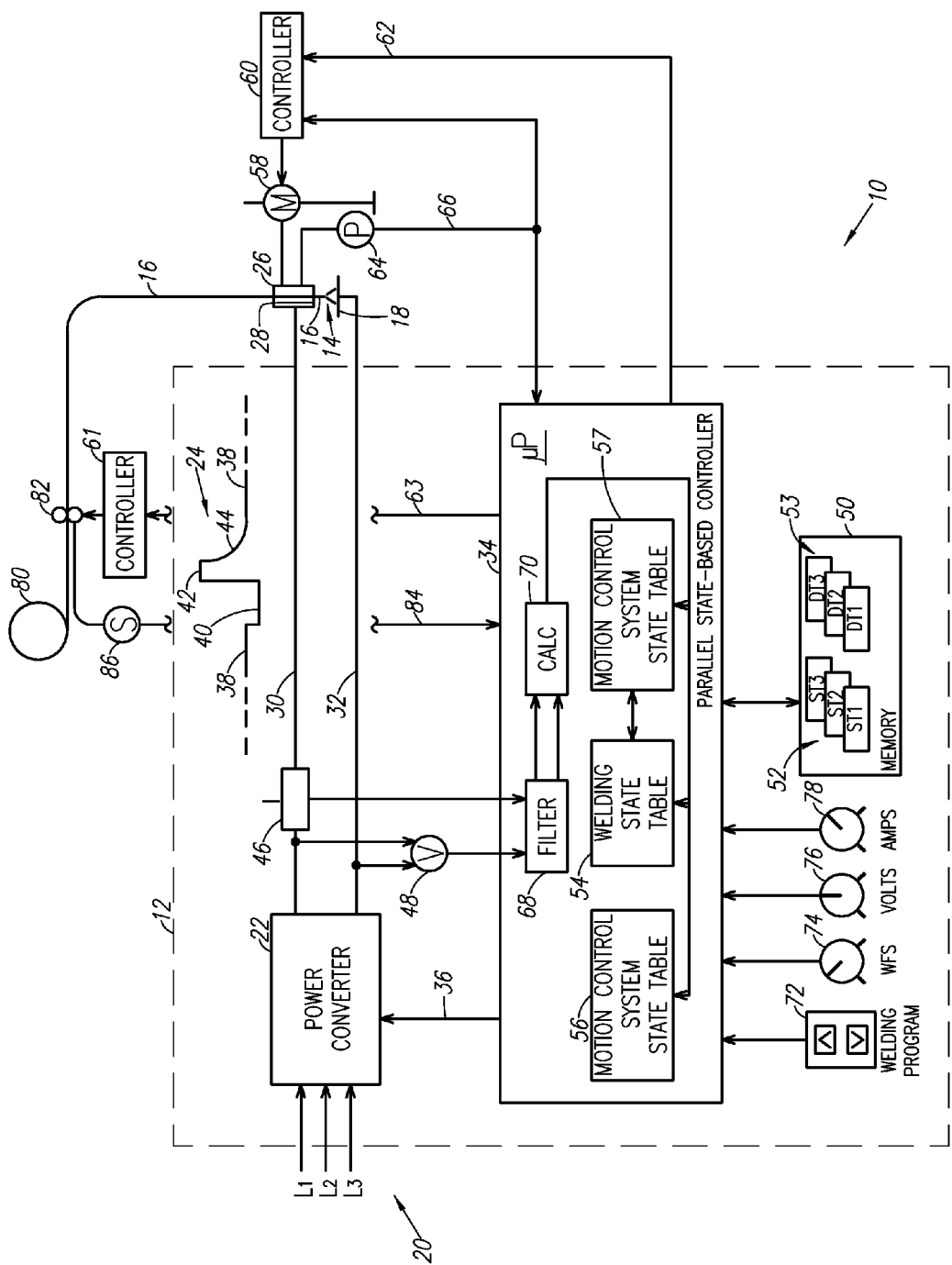
FIG. 6 is a schematic diagram of an example arc welding system.

The parallel state-based controller 34 can control several aspects of the arc welding system 10 simultaneously using multiple parallel state tables. In FIG. 6, for example, the parallel state-based controller 34 simultaneously controls the welding waveform, regulates CTWD and regulates WFS using three parallel state tables 54, 56, 57. One motion control system state table 56 is configured for controlling CTWD and the other motion control system state table 57 is configured for controlling WFS. The frequency with which the parallel state-based controller 34 adjusts the value of the motion control signals 62, 63 for controlling CTWD and WFS can be coordinated to avoid instabilities, such as position hunting. For example, the parallel state-based controller 34 can update the motion control signal 62 for CTWD at a first frequency, such as 100 Hz, and update the motion control signal 63 for WFS at a second, slower frequency, such as 10 Hz or less.

Figure 7:
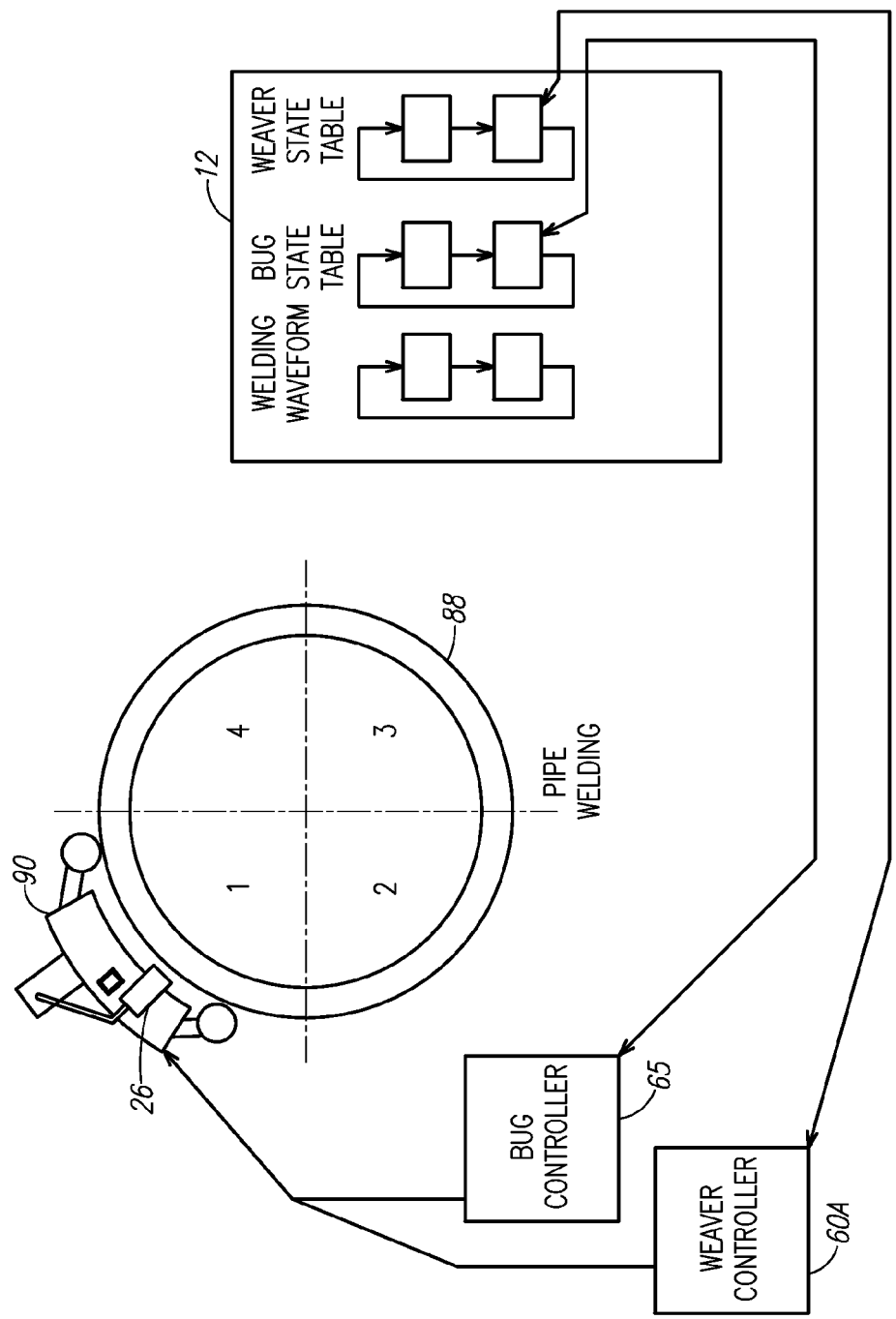
FIG. 7 is a schematic diagram of an example arc welding system.

FIG. 7 shows the welding power supply 12 simultaneously controlling the welding waveform and operations of a weaver controller 60a and a bug controller 65. The bug controller controls the circumferential (orbital) movement of the welding torch 26 around a pipe 88 using a welding bug 90. Thus, the welding power supply 12 simultaneously controls both the oscillating weave welding movements of the welding torch 12 and the travel of the welding torch along the workpiece, which is the pipe 88. To do this, the welding power supply 12 employs a parallel state-based controller using three parallel state tables, one for the welding waveform, one for controlling the weaving (i.e., "weaver state table"), and one for controlling the travel of the welding torch 26 around the pipe 88 (i.e., "bug state table").

Figure 8:
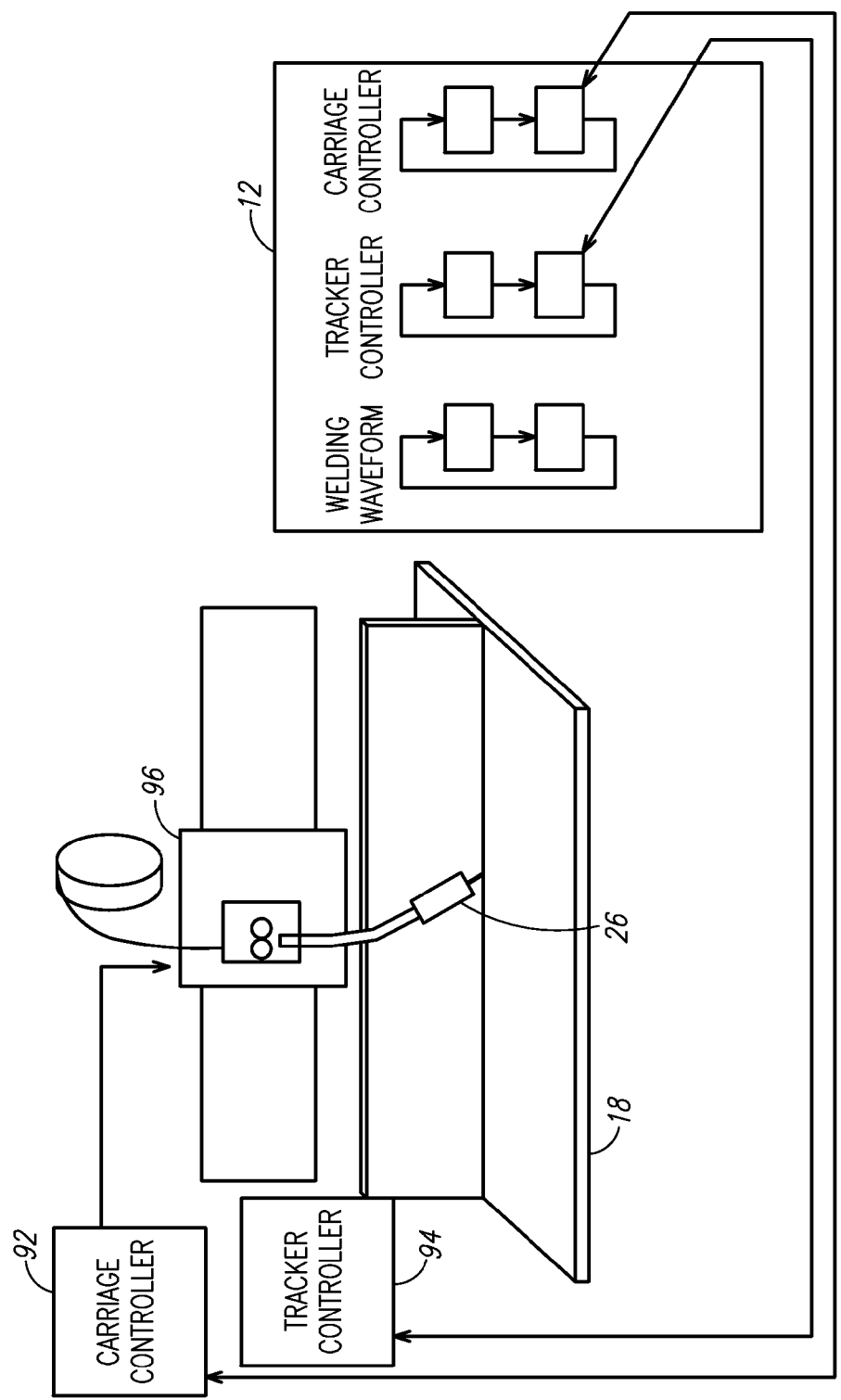
FIG. 8 is a schematic diagram of an example arc welding system.

FIG. 8 shows the welding power supply 12 simultaneously controlling the welding waveform and operations of a carriage controller 92 and a tracker controller 94. Again, the welding power supply 12 employs a parallel state-based controller using three parallel state tables, one for the welding waveform, one for controlling the movements of the carriage 96 (i.e., "carriage controller"), and one for the tracker controller 94 (i.e., "tracker controller"). The carriage controller 92 receives a motion control signal from the welding power supply 12 and, based thereon, controls the travel of the carriage 96 and the welding torch 26 longitudinally along the length of the workpiece 18. The joint tracker can be added as both an input device (seam track left or right/up or down) and an output device, (up/down, left/right slides to position the torch in the seam).

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method for controlling an arc welding system, comprising the steps of:
   providing the arc welding system, wherein the arc welding system comprises:
      a welding torch comprising a contact tip; and
      a welding power supply, the welding power supply comprising:
         a switching type power converter operatively connected to the welding torch,
         a parallel state-based controller comprising a processor that is configured to simultaneously control both operations of the switching type power converter according to a welding state table and movement of the welding torch according to a motion control system state table;
         a welding voltage sensor; and
         a welding current sensor;
   generating an electrical arc between the arc welding system and a workpiece;
   controlling, by the processor of the parallel state-based controller, the switching type power converter to generate a welding waveform according to the welding state table, the welding state table comprising a first plurality of sequential control states that together regulate open circuit voltage during touch retract starting and define a plurality of different current levels within the welding waveform during arc welding after the touch retract starting, wherein the step of controlling the switching type power converter comprises sequentially transitioning between control states of the welding state table based on at least one of a welding voltage signal from the welding voltage sensor and a welding current signal from the welding current sensor; and
   controlling, by the processor of the parallel state-based controller simultaneously with controlling the switching type power converter, the movement of the welding torch according to the motion control system state table, the motion control system state table comprising a second plurality of sequential control states that together control the touch retract starting, and a contact tip to work distance (CTWD) during arc welding, wherein the step of controlling the movement of the welding torch comprises sequentially transitioning between control states of the motion control system state table based on at least one of the welding voltage signal from the welding voltage sensor and the welding current signal from the welding current sensor and controlling the contact tip to work distance (CTWD) of the welding torch during arc welding, such that the welding torch is offset from the workpiece by the CTWD to provide a gap between the welding torch and the workpiece during arc welding.

2. The method of claim 1, wherein the arc welding system comprises a motion control system including a motion control system controller, the method further comprising the steps of:
   generating an analog motion control signal by the parallel state-based controller according to the motion control system state table;
   updating a signal level of the analog motion control signal at a frequency of at least 100 Hz; and
   regulating the CTWD by the motion control system according to the signal level of the analog motion control signal.

3. The method of claim 1, further comprising the step of determining that an electrode of the arc welding system has contacted the workpiece,
   wherein the motion control system state table comprises a retract state for retracting the welding torch from the workpiece upon determining that the electrode has contacted the workpiece, and
   wherein the motion control system state table further comprises a regulate CTWD state for regulating the CTWD based on at least one of the welding voltage signal from the welding voltage sensor and the welding current signal from the welding current sensor.

4. The method of claim 1, further comprising the steps of:
   switching from a first welding procedure that regulates welding voltage and is defined by the welding state table, to a second welding procedure that regulates welding current and is defined by a different welding state table; and
   automatically switching, by the parallel state-based controller, the motion control system state table from one that regulates the CTWD based on an averaged welding current to one that regulates the CTWD based on an averaged welding voltage.

5. The method of claim 1, wherein the step of controlling the movement of the welding torch comprises oscillating the welding torch to obtain a predetermined weld size.

6. A method for controlling an arc welding system, comprising the steps of:
   providing the arc welding system, wherein the arc welding system comprises:
      a welding electrode; and
      a welding power supply, the welding power supply comprising:
         an inverter operatively connected to the welding electrode,
         a parallel state-based controller comprising a processor that is configured to simultaneously control both of operations of the inverter according to a welding state table and movement of the welding electrode according to a motion control system state table;
         a welding voltage sensor; and
         a welding current sensor;
   generating an electrical arc between the welding electrode and a workpiece;
   controlling, by the processor of the parallel state-based controller, the inverter to generate a welding waveform according to the welding state table, the welding state table comprising a first plurality of sequential control states that together regulate open circuit voltage during touch retract starting and define a plurality of different current levels within the welding waveform during arc welding after the touch retract starting, wherein the step of controlling the inverter comprises sequentially transitioning between control states of the welding state table based on at least one of a welding voltage signal from the welding voltage sensor and a welding current signal from the welding current sensor; and controlling, by the processor of the parallel state-based controller simultaneously with controlling the inverter, the movement of the welding electrode according to the motion control system state table, the motion control system state table comprising a second plurality of sequential control states, wherein the step of controlling the movement of the welding electrode comprises sequentially transitioning between control states of the motion control system state table based on at least one of the welding voltage signal from the welding voltage sensor and the welding current signal from the welding current sensor, wherein the welding electrode is a consumable wire electrode, and the arc welding system further comprises a motor for feeding the consumable wire electrode at a wire feed speed and a motor controller for controlling the wire feed speed, and the parallel state-based controller generates a motion control signal according to the motion control system state table to regulate the wire feed speed while simultaneously controlling the welding waveform, and the motor controller adjusts the wire feed speed during arc welding according to the motion control signal wherein the second plurality of sequential control states together control the touch retract starting and a regulation of the wire feed speed during arc welding.

7. The method of claim 6, further comprising the step of determining that the welding electrode has contacted the workpiece, wherein the motion control system state table comprises a retract state for retracting the welding electrode upon determining that the electrode has contacted the workpiece, and wherein the motion control system state table further comprises a regulate wire feed speed state for maintaining a predetermined welding voltage.

8. The method of claim 6, wherein the arc welding system comprises a welding torch having a contact tip, and wherein the parallel state-based further comprises a third state table comprising a third plurality of sequential control states, the method further comprising the step of:

simultaneously with controlling the inverter and controlling the movement of the welding electrode, controlling, by the parallel state-based controller, a contact tip to work distance (CTWD) of the welding torch according to the third state table.

9. The method of claim 6, further comprising the steps of:

switching from a first welding procedure that regulates welding voltage and is defined by the welding state table, to a second welding procedure that regulates welding current and is defined by a different welding state table;

automatically switching, by the parallel state-based controller, the motion control system state table from one that controls movement of the welding electrode based on welding current level to one that controls movement of the welding electrode based on welding voltage level; and updating a signal level of the analog motion control signal at a frequency of at least 100 Hz.

\* \* \* \* \*